United States Patent
Shooshan

(10) Patent No.: US 9,207,527 B1
(45) Date of Patent: Dec. 8, 2015

(54) SYSTEM AND METHOD FOR DECORATING A PUMPKIN

(76) Inventor: Ryan Shooshan, Fairport, NY (US)

(*) Notice: Subject to any disclaimer, the term of this patent is extended or adjusted under 35 U.S.C. 154(b) by 20 days.

(21) Appl. No.: 13/480,139

(22) Filed: May 24, 2012

(51) Int. Cl.
| | |
|---|---|
| G03B 21/64 | (2006.01) |
| G09F 3/20 | (2006.01) |
| G09F 1/12 | (2006.01) |
| G09F 7/02 | (2006.01) |
| G02B 27/02 | (2006.01) |
| B29L 31/00 | (2006.01) |
| B29C 33/16 | (2006.01) |
| G09F 7/00 | (2006.01) |
| G09F 7/04 | (2006.01) |
| G09F 7/06 | (2006.01) |
| G09F 7/08 | (2006.01) |
| G09F 7/12 | (2006.01) |

(52) U.S. Cl.
CPC .................. *G03B 21/64* (2013.01); *G09F 1/12* (2013.01); *G09F 3/202* (2013.01); *G09F 7/02* (2013.01); *A44D 2203/00* (2013.01); *B29C 33/16* (2013.01); *B29L 2031/729* (2013.01); *G02B 27/024* (2013.01); *G09F 7/00* (2013.01); *G09F 7/04* (2013.01); *G09F 7/06* (2013.01); *G09F 7/08* (2013.01); *G09F 7/12* (2013.01)

(58) Field of Classification Search
USPC ........................................................ 362/122
See application file for complete search history.

(56) References Cited

U.S. PATENT DOCUMENTS

| | | | |
|---|---|---|---|
| 715,379 A | 12/1902 | Herd | |
| 736,506 A | 8/1903 | Duket | |
| 1,593,305 A * | 7/1926 | Kulka | 362/98 |
| 3,451,328 A * | 6/1969 | Swett | 206/493 |
| 3,593,021 A * | 7/1971 | Auerbach | 362/434 |
| 3,995,844 A * | 12/1976 | Hellman | 269/54.5 |
| 4,176,843 A * | 12/1979 | DeWitt, Jr. | 446/46 |
| 5,366,403 A * | 11/1994 | Weiss | 446/46 |
| 5,373,431 A * | 12/1994 | Hayman et al. | 362/364 |
| 5,842,771 A * | 12/1998 | Thrasher et al. | 362/101 |
| 6,010,235 A * | 1/2000 | Sawyer | 362/351 |
| 6,055,738 A | 5/2000 | Bardeen et al. | |
| 6,093,446 A | 7/2000 | Bardeen | |
| 6,116,750 A * | 9/2000 | Hentz | 362/148 |
| 6,241,361 B1 * | 6/2001 | Thrasher et al. | 362/101 |

(Continued)

OTHER PUBLICATIONS

Oxford Dictionary, "parallel", Oxford Online Dictionary <http://oxforddictionaries.com/definition/english/parallel?q=parallel>.*

(Continued)

*Primary Examiner* — David Sample
*Assistant Examiner* — Donald M Flores, Jr.
(74) *Attorney, Agent, or Firm* — Woods Oviatt Gilman, LLP; Dennis B. Danella, Esq.

(57) ABSTRACT

A system and method for decorating a vegetable, such as a pumpkin, is provided. The system includes a base frame disposed within an aperture defined in the pumpkin, and a cover having a design or image associated therewith that is selectively coupled to the base frame. The base frame may be a flexible, frusto-conical ring that has an outer edge positioned adjacent to an outer surface of the pumpkin. The outer edge may be at least partially formed of a magnetic material, and the cover may be formed of a material that is attracted to the magnetic material of the base frame to selectively attach the cover to the base frame. The system may include a colored sheet positioned behind the cover, and a protective backing positioned behind the colored sheet to provide protection from the heat generated from the light source within the pumpkin.

23 Claims, 5 Drawing Sheets

(56) References Cited

U.S. PATENT DOCUMENTS

| | | | |
|---|---|---|---|
| 6,250,776 B1* | 6/2001 | Burkitt et al. | 362/267 |
| 6,350,046 B1* | 2/2002 | Lau | 362/364 |
| 6,422,525 B1* | 7/2002 | McAdam et al. | 248/346.01 |
| 6,435,691 B1* | 8/2002 | Macey et al. | 362/101 |
| 6,449,889 B1* | 9/2002 | Hottenstein | 362/205 |
| 6,467,209 B1* | 10/2002 | Vickers | 40/617 |
| 6,619,810 B2 | 9/2003 | Kramer et al. | |
| 7,204,618 B1* | 4/2007 | Kuelbs et al. | 362/367 |
| 7,832,906 B2* | 11/2010 | Damman | 362/311.13 |
| 8,028,471 B2* | 10/2011 | Weder | B65B 25/026 47/72 |
| 2003/0067790 A1* | 4/2003 | Brown et al. | 362/565 |
| 2005/0013136 A1* | 1/2005 | Rutchik | 362/365 |
| 2006/0086742 A1 | 4/2006 | Napientek et al. | |
| 2006/0245196 A1 | 11/2006 | Haynes | |
| 2007/0036920 A1 | 2/2007 | Birkmann et al. | |
| 2011/0117812 A1* | 5/2011 | Conner | 446/391 |

OTHER PUBLICATIONS

[NPL-1] General Electric Corporation "GE Plastics Valox PBT/PET/PC resin"; General Electric Plastics, (Oct. 11, 2010). <http://www.kmsbearings.com/pdf/Valox%20brochure%2010567_4.pdf>.*

[NPL #2] G., Shelby; "Tutorial: Pumpkin Flower Arrangement". (Nov. 12, 2011). <http://meaniegreene.blogspot.com/2011/11/tutorial-pumpkin-flower-arrangement.html>.*

[NPL #3] Linauer, Kristi; "Miniature Pumpkin Vases". (Oct. 26, 2011). <http://www.addicted2decorating.com/mini-pumpkin-vases%E2%80%94one-idea-five-ways.html>.*

[NPL #4] Chris; "Transplanting". (May 14, 2010). <http://web.archive.org/web/20100514092511/http://chrisandjodi.net/>.*

JP's Jammin' Pumpkins, http://www.jamminpumpkins.com/, web site.

Ball, Jay, PumpkinGlow.com, web site, Smithfield, Utah.

* cited by examiner

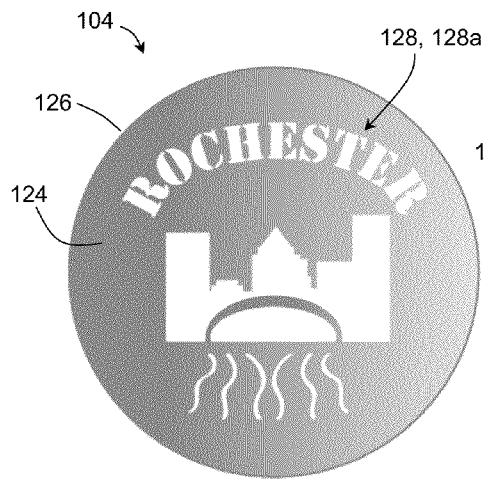
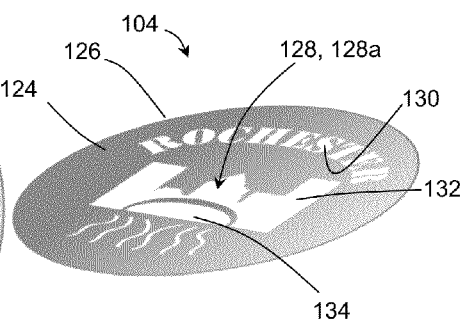
FIG. 6A    FIG. 6B
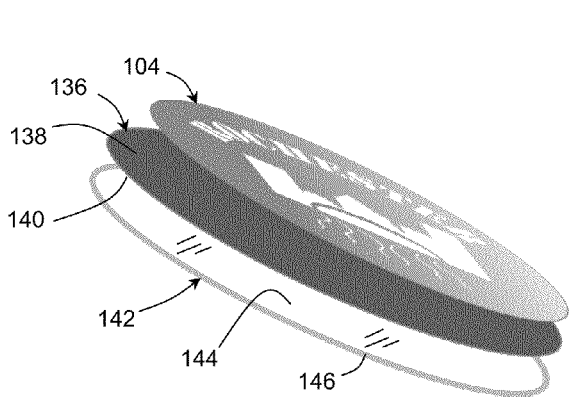
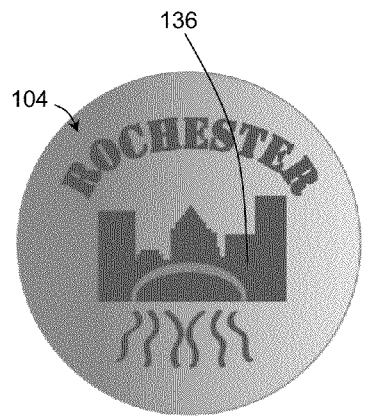
FIG. 7A    FIG. 7B

SYSTEM AND METHOD FOR DECORATING A PUMPKIN

FIELD OF THE INVENTION

The present invention is directed to a system and method for decorating a fleshy vegetable or fruit, such as a pumpkin; in particular, the present invention includes a base frame and a cover, wherein the base frame is inserted into a carved opening defined in the pumpkin, and the cover, having a design or image associated therewith, is coupled with the base frame to provide a decorated pumpkin.

BACKGROUND OF THE INVENTION

Halloween has always been a popular holiday and has been increasingly popular over the past decade. Millions of people all over the world enjoy celebrating this holiday with their family and friends. According to the US Census Bureau's 2010 report, there were approximately 41 million potential trick-or-treaters who could have visited 116.7 million households in the United States. Decorations are a huge part of the Halloween fun, and nothing is more prevalent than the pumpkin. The USDA National Agricultural Statistics Service estimated that there were 1.1 billion pounds of pumpkins produced in the major-pumpkin producing states in 2010. A fair number of these pumpkins were carved as Jack-O-Lanterns for Halloween.

While the classic Jack-O-Lantern design still has its place, expectations have evolved to desire more intricately-designed features. A well carved pumpkin is an absolute must, with the greatest appreciation going to the more elaborate and intricate designs. Until now, these intricate designs were only achievable by a small subset of people who possessed both a natural artistic ability and a lot of free time.

Presently, the average home carver is unable to produce intricate patterns and is generally left with rudimentary carvings of block faces created by straight-line cuts. In an effort to assist once-a-year carvers in their attempts to create the perfect pumpkin, template-based systems have been developed. These template systems generally comprise a flexible stencil that is affixed to the face of the pumpkin. A series of holes perforate the stencil and are used to direct the carver in punching holes into the flesh of the pumpkin with a sharply pointed tool or drill bit. Additionally, or alternatively, the carver traces the stenciled pattern onto the pumpkin flesh using a pen or marker. Once all of the holes are punched, or the pattern traced, the stencil is removed leaving a marked-up or hole-punched pumpkin for finishing. The carver then has to connect the dots using a sharp knife or saw to remove the desired portion of flesh.

While the template-based approach may offer the availability for more intricate carvings, these systems suffer a number of drawbacks. First, this method is time-consuming as the carver must attach the template, punch or trace the pattern, and then finish each intricate cut by following the pattern, which may be difficult due to the number and close proximity of punched holes. Second, these systems are dangerous, particularly where young children are present, as multiple tools need to be used. These tools include a sharp-pointed instrument or drill bit to puncture the pumpkin flesh (and if not properly handled, human flesh) and an extremely sharp knife or saw having a thin blade and fine edge. Third, the image carved into the pumpkin may intend to have thin portions of flesh remaining to create the intricacy. Thus, any error in carving will accidently cut the thin strip of flesh thereby destroying any intricacy desired in the first place. Fourth, the images carved are static—that is, once the image is carved it cannot be changed. If a second image is later desired, a new pumpkin will have to be carved from scratch. Finally, combining the above-referenced drawbacks creates an environment where children will not have fun carving the pumpkin which is a primary objective of the activity. The dangerous tools required prevent the children from being too close to the carver during carving for fear of injury, while the intricate designs prevent the children from being too close to the pumpkin post-carving as the pumpkin is easily damaged. Additionally, the time required to carve the pumpkin will likely be too long thereby leading to boredom.

Alternatively, intricately carved pumpkins can be purchased from a professional carver as pre-cut pumpkins or on a work-for-hire basis. While a fancily-carved pumpkin is achieved using this approach, drawbacks include expense and lack of involvement. Costs increase because a purchaser, beyond spending money to buy a pumpkin, is also paying the artist for the labor required to create the carving. The more intricate the carving, the higher the price of the pumpkin. Furthermore, part of the charm for children when creating a Jack-O-Lantern is removing the seeds and inner membranes of the pumpkin. Purchasing a pre-made Jack-O-Lantern prevents children from enjoying this annual fall ritual. Lastly, additional disadvantages to pre-cut pumpkins are the same as mentioned above—namely that the image is delicate and easily damaged, and the image is static and cannot be changed.

As such, there is a need for a system that provides a safe and efficient way to allow even the most artistically- and time-challenged person to interchangeably decorate a pumpkin with elaborate and intricate designs. The present invention addresses this and other needs.

BRIEF SUMMARY OF THE INVENTION

In general, the present invention is directed to a system and method for quickly and easily decorating a vegetable or fruit, such as a pumpkin, that addresses the above-referenced limitations presented by prior art carving systems, such as reducing carving time, increasing safety, offering the ability to add colors to the image, offering the ability to change the image and providing a less expensive system that is reusable rather than being a single-use template. These features and other features of the present invention will be described in more detail below.

One aspect of the present invention is directed to a system and method to decorate a pumpkin with a design. The system generally includes a base frame and a cover having a design associated therewith. For example, the design may be defined in the cover or printed on the cover. The base frame is adapted to be positioned within an aperture defined in the pumpkin, and the cover is configured for being coupled with the base frame so that it fits within the opening of the base frame to provide a decorated pumpkin. The base frame and cover may be packaged as a kit or packaged individually. In one embodiment, a consumer may receive multiple covers within the kit, wherein each cover has its own unique design. A further embodiment may provide for blank covers so that consumers can create their own designs, such as, by cutting out a design or printing a design on the cover.

To use the system, the consumer may make one or more circular cuts to the pumpkin. A first cut may be made around the stem to enable hollowing out of the shell, and the second cut may be made in a side portion of the shell of the pumpkin for accepting the base frame. Alternatively, the first cut around the stem may be eliminated, wherein the pumpkin may be cleaned out after the second cut in the pumpkin is made. The base frame is inserted into the hole cut in the side portion of the pumpkin shell and the cover is selected and coupled with the base frame so that it fits within an opening defined by the base frame. The covers are interchangeable so they may be switched at any time. When the pumpkin shell is lit up at night, the pumpkin decorated using the present system and method appears as if it were carved directly from the pumpkin's shell because the light emitted within the pumpkin passes through the pattern formed in the cover to define an image or design. It is also contemplated that the cover further include translucent colored films to give the consumer the ability to add vibrant colors to the designs, particularly those covers that have designs that are defined in the cover.

Additional objects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein:

FIG. 6A is a front view of a cover with a design or image associated therewith;

FIG. 6B is a perspective view of the design cover shown in FIG. 5A;

FIG. 7A is a perspective view of a cover assembly including a colored film placed between a protective backing and the cover;

FIG. 7B is a front elevational view of the cover assembly shown in FIG. 7A; and

DETAILED DESCRIPTION OF THE INVENTION

Figure 1:
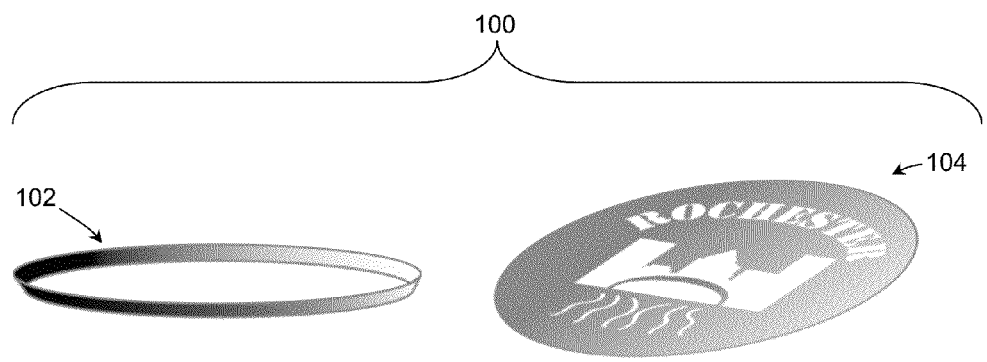
FIG. 1 is a perspective view showing a system for decorating a vegetable or fruit in accordance with one aspect of the present invention.

Referring to the drawings in detail, and specifically to FIG. 1, reference numeral 100 generally designates a system for decorating a vegetable or fruit in accordance with one aspect of the present invention. In general, the system 100 includes a base plate 102 and a cover 104. While system 100 is shown and described for use with decorating a pumpkin, it should be understood that the present invention may be used with any appropriate fleshy fruit or vegetable such as squashes, avocados, gourds, melons, watermelons, pumpkins, and the like.

Figures 2A, 2B:
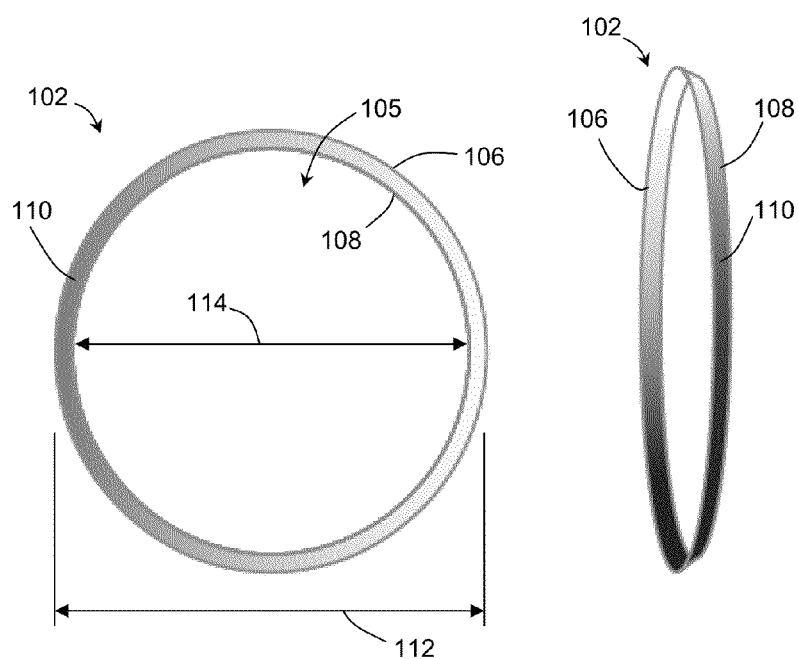
FIG. 2A is a front elevational view of a base frame shown in FIG. 1A.
FIG. 2B is a perspective view of the base frame shown in FIG. 2A.

As shown in greater detail in FIGS. 2A and 2B, base frame 102 is configured so that cover 104 may be selectively positioned within an opening 105 defined in base frame 102. In particular, base frame 102 may be formed as a frusto-conical ring having an outer edge 106 and an inner edge 108 having a tapered side wall 110 extending therebetween. Outer edge 106 may have a generally circular cross-section with a major diameter 112. Inner edge 108 may have a generally circular cross-section having a minor diameter 114, which is smaller than major diameter 112. While outer edge 106 and inner edge 108 are shown and described as parallel concentric circles, it is envisioned that inner edge 108 may have alternative surface contours so as to form a tapered side wall having a jagged inner edge or an inner edge having included curves. Although base frame 102 is shown and described as a frusto-conical ring, it is contemplated that an alternative base frame may be constructed so that the outer edge and inner edge have generally circular cross-sections of generally the same diameter so as to create a cylindrical ring.

It should be understood that the overall circumference of base plate 102 may be formed in various sizes to accommodate different sizes of vegetables. For example, it is contemplated that the decorating system would have a range of sizes appropriate for use on a number of different sized vegetables (e.g. an extra-small eight inch (8") diameter ring for very small vegetables such as melons or gourds; a small twelve inch (12") diameter ring for small vegetables such as large melons, watermelons, or small pumpkins; a medium eighteen inch (18") ring for medium sized pumpkins or watermelons; a large twenty-six inch (26") ring for large pumpkins or watermelons; and an extra-large thirty-four inch (34") ring for extra-large pumpkins). Side wall 110 may be approximately one inch (1") wide with a thickness of about one-eighth inch (⅛"). Slant width and/or thickness are selected such that base frame 102 will flex to conform to a hole cut into the pumpkin.

Outer edge 106 may be used as a guide for making a circular aperture in a pumpkin's outer surface to accommodate base frame 102. Base frame 102 is held in place against the outer surface of the pumpkin and outer edge 106 is traced out with a pen or marker. Base frame 102 is removed and the pumpkin is cut along the traced line. As inner edge 108 has a smaller diameter 114 relative to diameter 112 of outer edge 106, a snug fit within the aperture is ensured as base frame 102 may be pushed into the aperture until the entire outer edge 106 is generally flush with the outer surface of the pumpkin. Base frame 102 is held in place through friction created between side wall 110 and the cut flesh of the pumpkin shell. The frusto-conical shape of base frame 102 allows for minor expansion and contraction allowing for a snug insertion into an imperfectly cut aperture in the pumpkin. Additional methods of securing base frame 102 within the aperture formed in the pumpkin are also contemplated herein, including but not limited to use of an adhesive between side wall 110 and the cut flesh, bendable flaps extending from inner edge 108, as well as snaps, hooks, clasps, and the like. Base frame 102 may also be flexible along the diameters and other chords of the circle thereby allowing base frame 102 to flex to match the convex shape of the pumpkin. Base frame 102 may be constructed of any suitable material such as a thin metal, such as, but not limited to, aluminum, stainless steel, a thin plastic, a suitable rubber-based material, foam based materials including Styrofoam, or paper based materials. In addition, at least outer edge 106 of base frame 102 may be formed of a magnetic material, such as stainless steel, to allow for cover 104 to be coupled with base frame 102. It is also contemplated that the entire base frame 102 is formed of a magnetic material. Further, base frame 102 may be constructed of a flame resistant or non-flammable material. While base frame 102 has been described as being circular, it should be understood that base frame 102 may be formed in other shapes, such as, but not limited to, elliptical, oval, square, rectangular, triangular, or other polygonal shape. Also, it should be understood that side wall 110 may be formed so that it is cylindrical, not tapered.

Figure 3:
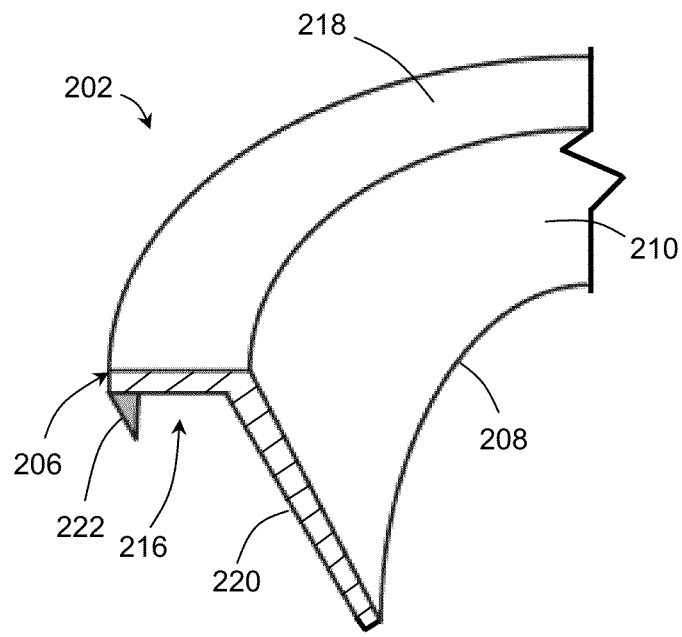
FIG. 3 is an enlarged view of a portion of another aspect of the base plate in accordance with the present invention.

Referring to FIG. 3, an enlarged view of one alternative base frame, which is generally indicated by numeral 202. Base frame 202 is constructed similarly to base frame 102 in that it is a frusto-conical ring, or other desired shape, having an outer edge 206 and an inner edge 208 having a tapered side wall 210 extending therebetween. Both outer edge 206 and inner edge 208 may be generally circular in cross-section with outer edge 206 having a major diameter that is greater than a minor diameter of inner edge 108. While outer edge 106 and inner edge 108 are shown and described as parallel concentric circles, it is envisioned that inner edge 108 may have alternative surface contours so as to form a tapered side wall having a jagged inner edge or an inner edge having included curves. Side wall 210 may be generally approximately one inch (1") wide with a thickness of about one-eighth inch (⅛"). However, base frame 202 may have a channel 216 defined adjacent to outer edge 206. Channel 216 may include an upper surface 218 that extends outwardly from outer surface 220 of base frame 202, and a lip 222 extending downwardly from upper surface 218 in a direction that is generally parallel with outer surface 220 and generally toward inner edge 208. Upper surface 218 is generally about one-half inch (½") wide and lip 222 is generally about one-quarter inch (¼") wide. In addition, base frame 202 may be formed of a magnetic material on one or more of side wall 210 and/or upper surface 218 so that cover 104 may be selectively coupled with base frame 202. Also, it is contemplated that the entire base frame 202 is formed of a magnetic material.

When base frame 202 is inserted into an aperture formed in the shell of a pumpkin, side wall 210 passes through the aperture adjacent to the cut edge while upper surface 218 rests on the outer surface of the pumpkin. Base frame 202 is pushed into the aperture in the pumpkin such that lip 222 is pressed into the flesh of the pumpkin shell. Base frame 202 is held in place through friction between side wall 210 and the cut flesh of the pumpkin, while lip 222 further secures the placement of base frame 202 within the pumpkin. Additional securing methods are also contemplated, including but not limited to use of an adhesive between side wall 210 and the cut flesh, bendable flaps extending from inner edge 208, as well as snaps, hooks, clasps, and the like. Base frame 202 may be formed in a manner that is similar to that which was described with respect to base frame 102.

Figures 4A, 4B:
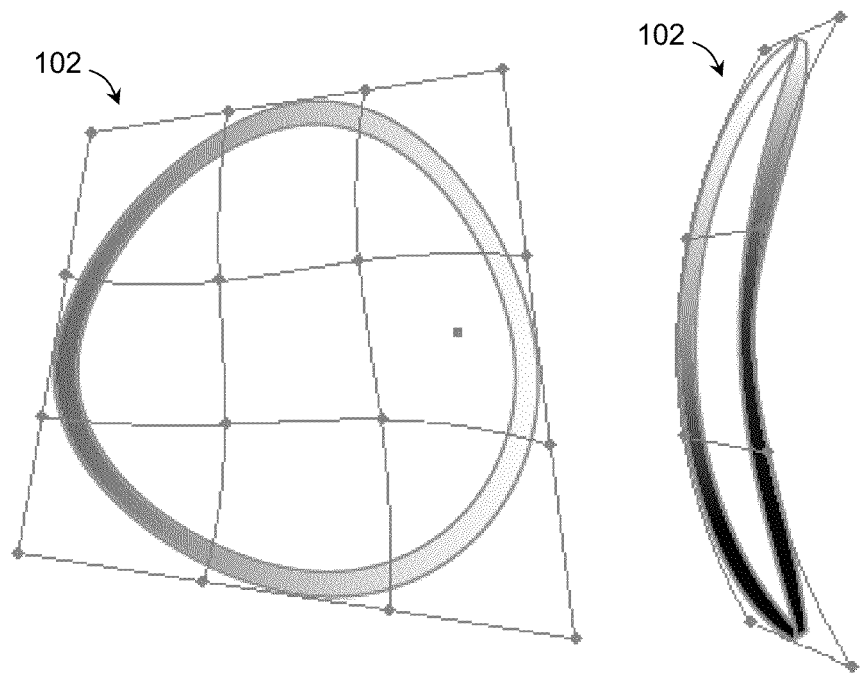
FIG. 4A is a front elevational view of the base frame shown in FIGS. 2A-2B with contour mapping illustrating the flexibility of the base frame.
FIG. 4B is a side perspective view of the base frame shown in FIG. 3A with contour mapping illustrating the flexibility of the base frame.

FIGS. 4A and 4B present contoured views of a base frame, which apply equally to base frame 102 and base frame 202. As shown in FIG. 4A, the base frame may be formed so that it is able to flex to compensate for any surface irregularities in the pumpkin face and/or to fit the base frame into imperfectly cut circular holes. The base frame is also able to flex to match the convex shape of a pumpkin as shown in FIG. 4B. The base frame retains its cross-section with the inner edge 108, 208 being disposed interiorly to outer edge 106, 206, respectively. Thus, when inserted into a pumpkin shell the outer edge of the base frame is flush with the outer surface of the cut pumpkin so that minimal gaps exist between the base frame and the pumpkin.

Figure 5A:
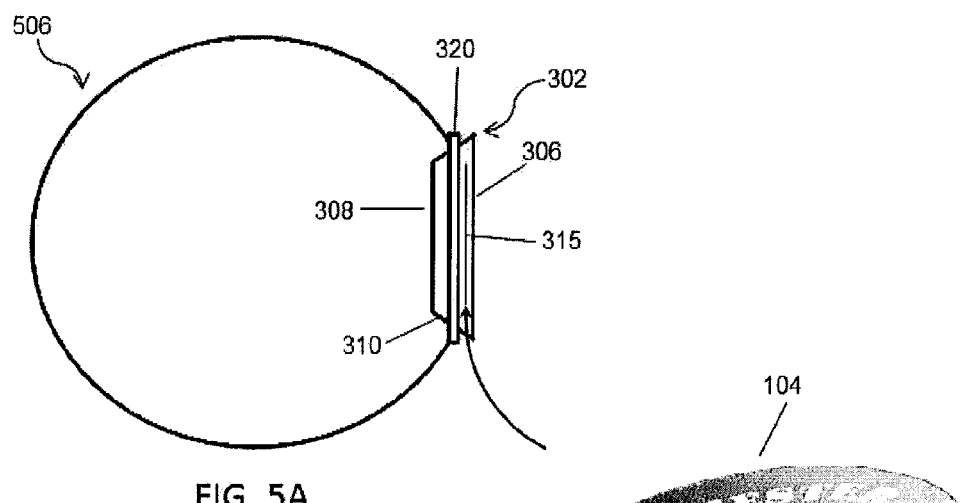
FIG. 5A is a top cross-sectional view of another aspect of the base plate in accordance with the present invention.
Figure 5B:
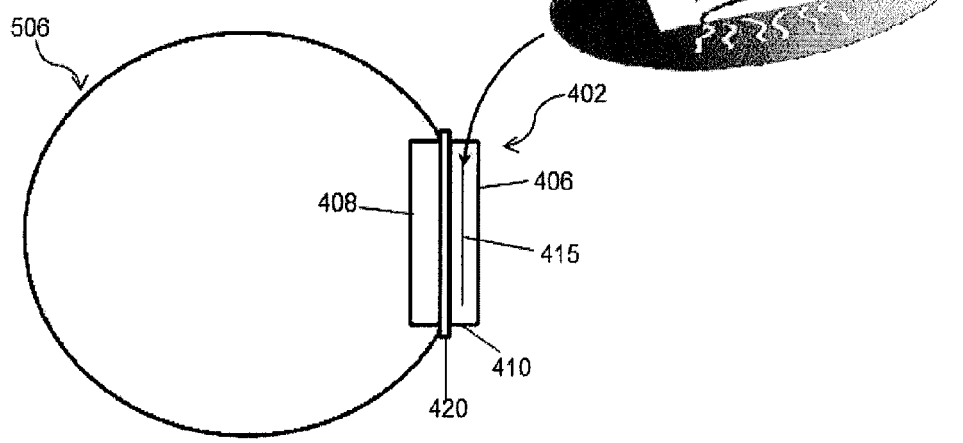
FIG. 5B is a top cross-sectional view of yet another aspect of the base plate in accordance with the present invention.

FIGS. 5A and 5B illustrate top cross-sectional views of alternative aspects of the present invention including base frames 302, 402 adapted for use in decorating a pumpkin. As described above with reference to FIGS. 2-4, an aperture is cut into the flesh of a pumpkin 506 into which the base frame is inserted. As shown in FIG. 5A, base frame 302 is constructed similarly to base frame 102 and is generally a frusto-conical ring having an outer edge 306 and an inner edge 308 defining a tapered side wall 310. Base frame 302 further includes a ridge 320 extending outwardly from tapered side wall 310. Ridge 320 is proportioned so as to limit the insertion of base frame 302 within the aperture such that ridge 320 contacts the outer face of pumpkin 506 thereby leaving a portion of side wall 310 projecting outwardly from outside the pumpkin shell. Ridge 320 aids in preventing the base plate from being inserted too far into the shell while also aiding in securing the base frame to the pumpkin. In one embodiment, cover 104 is removably attached to the outer edge 306 as described above with reference to FIGS. 2-4. In an alternative embodiment utilizing base frame 302, the base frame further includes a slot 315 located in side wall 310 between ridge 320 and outer edge 306. Slot 315 is proportioned to receive cover 104 when cover 104 is inserted within slot 315, and constrained within base frame 302. This slotted connection permits quick and easy interchange of cover 104 by removing one cover from base frame 302 by sliding the cover out of slot 315 and replacing that cover with an alternative cover.

With regard to FIG. 5B, an alternative embodiment of a base frame is shown generally designated as reference number 402. Base frame 402 is similar to base frame 302 with the exception that outer edge 406 and inner edge 408 have generally similar diameters such that side wall 410 has a generally cylindrical vertical cross-section. As with base frame 302, base frame 402 includes ridge 420 to prevent over-insertion of base frame 402 within pumpkin 506. In one embodiment, cover 104 is mounted onto edge 406 as described above with reference to FIGS. 2-4. In an alternative embodiment, base frame 402 has a slot 415 configured for receiving cover 104 to provide a slotted connection. Cover 104 passes through the slot in side wall 410 and is housed within base frame 402.

Referring now to FIGS. 6A and 6B, one example of a cover that may be used in the system 100 is designated by numeral 104. Cover 104 generally includes an outer surface 124 having a peripheral edge 126. Cover 104 is adapted for being selectively coupled with base frame 102, 202, 302, 402 and extends across at least a portion of opening 105 defined in base frame 102, 202, 302, 402. An indicia 128, such as a design or image, is associated with outer surface 124, wherein indicia may be defined in outer surface 124 or printed on outer surface 124. For example, an image 128a may be made up of one or more openings 130, 132, 134, etc. which, when viewed as a whole, create a completed image. The image of the skyline of the city of Rochester, N.Y. shown in FIGS. 1, 6A, 6B, 7A, 7B, and 8 is for illustrative purposes only. Any desired image may be created within outer surface 124 of cover 104. Cover 104 may be a flat, flexible disc with its peripheral edge 126 selected to match and fit within the opening defined by its corresponding base frame 102, 202, 302, or 402. Although cover 104 may be any thickness, in one embodiment of the present invention, cover 104 may be between one-eighth inch (⅛") and one-quarter inch (¼") thick. Additional thicknesses are also contemplated to incorporate various designs or images.

Cover 104 is flexible along its circumference thereby allowing for expansion and contraction. The expansion and contraction allows for attachment of cover 104 onto the base frame 102, 202, 302, 402, which may have been slightly contorted upon the insertion of base frame 102, 202, 302, 402 into an imperfectly cut aperture. Cover 104 may also be flexible across surface 124, allowing it to flex to match the convex shape of the pumpkin and that of the base frame 102, 202, 302, 402. Cover 104 may be attached to base frame 102, 202, 302, 402 using any suitable means such as but not limited to an adhesive, a threaded connection, and any type of male-to-female fastener including clips, snaps, clasps, brackets, hook-and-loop, slotted connection, and the like. In one aspect of the present invention, cover 104 may be formed of a material adjacent to peripheral edge 126 that is attracted to the magnetic material located on base frame 102, 202, 302, 402, thereby providing for a magnetic connection between cover 104 and base frame 102, 202, 302, 402. While it has been stated that base frame 102, 202, 302, 402 may include a magnetic material that allows cover 104 to be selectively coupled thereto, it is also contemplated that the entire cover 104 or peripheral edge 126 of cover 104 include a magnetic material and the base frame 102, 202, 302, 402 be formed of a material that attracts to the magnetic material thereby allowing cover 104 to be coupled with base frame 102, 202, 302, 402. In an embodiment of the present invention, cover 104 may be made from a flexible and non-flammable or flame resistant rubber or plastic that can be easily washed between uses. Cover 104 may further be colored orange in locations surrounding the image of design 128 thereby allowing the cover to blend in with the outer surface of the pumpkin.

As best seen in FIGS. 7A and 7B, the system 100 may further include a colored sheet 136 that may be used along with cover 104 to decorate a pumpkin using colored images or designs. In particular, colored sheet 136 is disposed behind cover 104 so that colored sheet 136 is positioned between cover 104 and the light source located in the interior space of the pumpkin. Colored sheet 136 may be coupled with base frame 102, 202, 302, 402 or colored sheet 136 may be coupled directly to the inner surface of cover 104 in one or more pieces extended over one or more of openings 130, 132, 134, etc. Colored sheet 136 may be a transparent or translucent film and includes a face 138 including a peripheral edge 140. In the case that colored sheet 136 is interposed between cover 104 and base frame 102, 202, 302, 402, peripheral edge 140 is selected to correspond with peripheral edge 126 of cover 104 and base frame 102, 202, 302, 402. Colored sheet 136 would then be secured to base frame 102, 202, 302, 402 by the connection between base frame 102, 202, 302, 402 and cover 104.

The system 10 may also include an optional protective backing 142 to be used in conjunction with cover 104 and, if used, colored sheet 136, to protect these components from the heat generated from the light source within the pumpkin. Protective backing 142 is disposed between cover 104 and the interior of the pumpkin, and may be coupled with one or more of base frame 102, 202, 302, 402 cover 104, and colored sheet 136. Protective backing 142 includes a transparent or translucent film 144 including a peripheral edge 146. Peripheral edge 146 may be configured to correspond with peripheral edge 126 of base frame 102, 202, 302, 402. Peripheral edge 146 includes an appropriate attachment mechanism so that protective backing 142 is releasably attached to base frame 102, 202, 302, 402 as described above with reference to cover 104. Colored sheet 136 and cover 104 are then secured to protective backing 142 using similar appropriate methods. For example, protective backing 142 may be attached to base frame 102, 202, 302, 402 by a magnetic connection, with cover 104 attached to protective backing 142 by a similar magnetic connection. Colored sheet 136 may then be constrained between protective backing 142 and cover 104. An alternative aspect includes permanently affixing protective backing 142 to cover 104 using an adhesive so that colored sheet 136 is fixed between protective backing 142 and cover 104. A further aspect allows for protective backing 142 to be fixedly secured to cover 104 while also being adapted so as to create an open slot between protective backing 142 and cover 104. Interchangeable colored sheets may then be selectively inserted into the slot to create the desired colored projection.

Colored sheet 136 and protective backing 142 may be formed of a suitable non-flammable or flame resistant plastic or rubber material. Colored sheet 136 and protective backing 142 may also exhibit the same flexibility as cover 104 so as to properly conform to the contours of base frame 102, 202, 302, 402 and cover 104. When lit up by a candle or other light source placed within the pumpkin shell, colored sheet 136 permits the pumpkin's design or image 128 to appear in color. While colored sheet 136 is shown as a single block color, it should be understood that a colored sheet can be constructed to include multiple colors or patterns.

Figure 8:
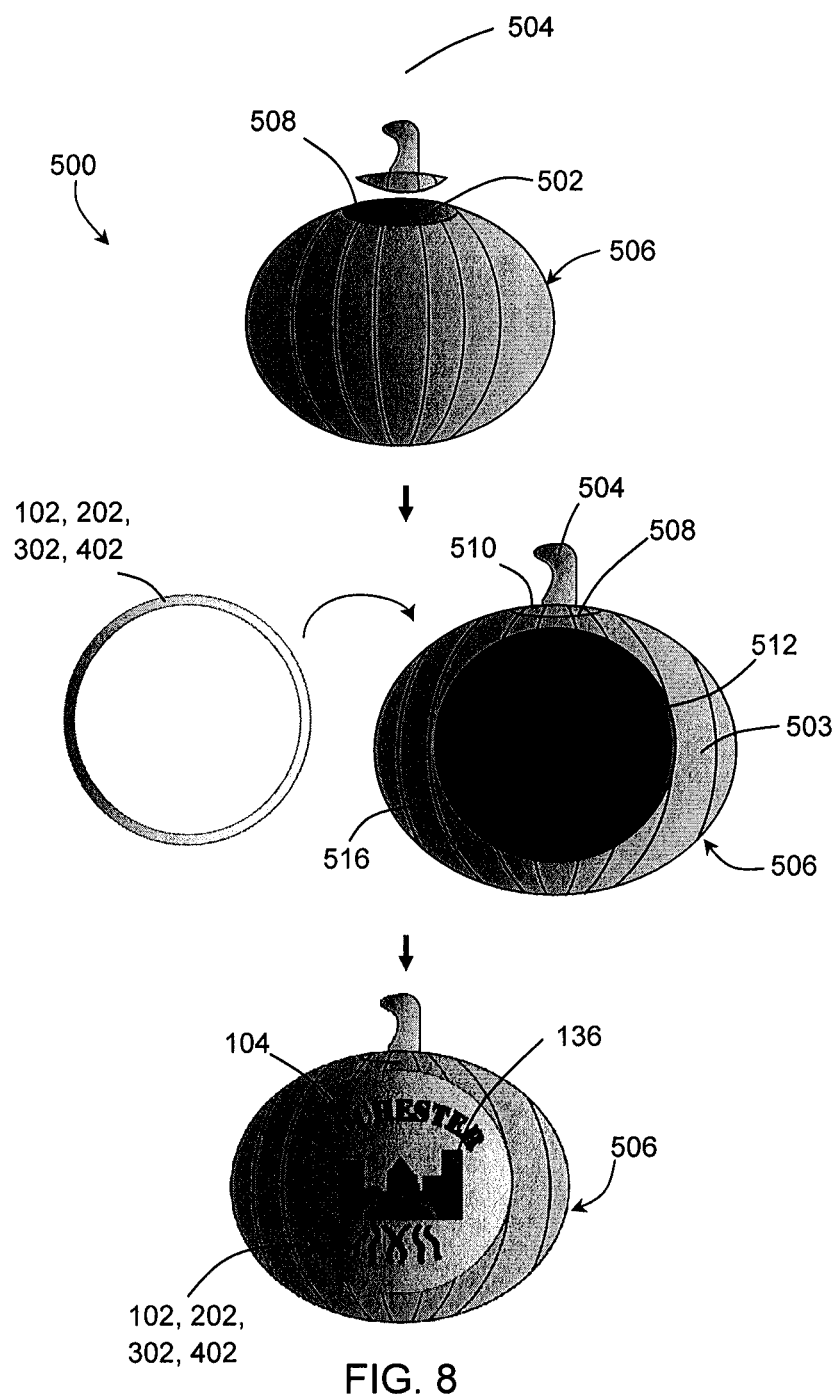
FIG. 8 is an illustrative flow chart showing a method of decorating a vegetable in accordance with one aspect of the present invention including the insertion of the base frame into an aperture defined in a pumpkin and coupling the cover with the base frame so that the cover fits within the opening in the base frame.

Referring now to FIG. 8, a method of decorating a vegetable, such as a pumpkin, using system 100 is shown generally by reference numeral 500. First, an access hole 502 may be cut in an outer shell 503 around a stem 504 of pumpkin 506. For example, an access cut 508 is cut into pumpkin 506 to form a lid 510 therefor. One way to remove lid 510 from access hole 502 is by using stem 504. Removal of lid 510 allows access to an interior compartment of pumpkin 506 so that the contents within pumpkin 506 can be removed so as to create a shell having a thickness.

The method 500 includes the step of cutting an aperture 512 into a side wall of pumpkin 506. As aperture 512 also permits access to the interior of pumpkin 506, it should be understood that the first step of cutting access hole 502 may be omitted from method 500. As described previously with reference to FIGS. 2A and 2B, aperture 512 is cut in a shape that generally corresponds to the shape of base frame 102, 202, 302, 402 so that base frame 102, 202, 302, 402 may be disposed within aperture 512. Base frame 102, 202 is then urged into aperture 512 as illustrated by arrow 514 until its outer edge 106 (or upper surface 218) is flush with an outer surface 516 of pumpkin 506. Alternative, as described above with reference to FIGS. 5A and 5B, base plate 302 or 402 is urged into aperture 512 until ridge 320 or 420, respectively, contacts the outer shell 503 of the pumpkin.

Once base frame 102, 202, 302, 402 is inserted within aperture 512, cover 104, and optionally colored sheet 136 and protective backing 142, are releasably coupled to the base frame 102, 202, 302, 402 such that outer surface 124 of cover 104 with the design or image 128 associated therewith faces outward. While outer edge 106 (or upper surface 218 of design frame 202) is shown around outer surface 124, it should be understood that cover 104 may completely cover base frame 102, 202 such that base frame 102, 202 cannot be seen when looking at pumpkin 506. A candle or other light source may be accessed by removing lid 510 or prior to coupling cover 104 to base frame 102, 202, 302, 402 such that light emitted from light source illuminates design or image 128. Cover 104 is releasably coupled with base frame 102, 202, 302, 402 thereby allowing for one or more different covers to be used with base frame 102, 202, 302, 402 to change the pumpkin design as desired without requiring a consumer to purchase more than one pumpkin.

While the above system and method has shown and described the base frames, cover, colored sheet and protective backing as being circular, it should be understood that any suitable shape may be used, such as elliptical, oval, square, rectangular, triangular, or other polygonal shape.

The present invention provides a number of advantages that overcome the problems and deficiencies that exist with prior art vegetable decoration systems. For example, one advantage provided by the present invention is the removal of the need to conduct numerous, delicate and time-consuming cuts to produce an intricate design. A consumer can quickly cut an aperture to fit a base frame to the vegetable, with the base frame itself forming the template for guiding the cutting of the aperture. Additionally, the delicate features of an intricately carved design or image in the prior art are susceptible to damage or destruction either by a misplaced cut or simply by applying to much force to the narrow strip of shell. This problem is further compounded as the vegetable dries over time causing the thin strips of shell to constrict and possibly fracture. The present invention overcomes these limitations as the intricate design or image is constructed out of a durable material, such as, but not limited to, plastic or rubber and will therefore not shrink or crack. Also, the use of a durable material permits even more intricate designs than would be available if carving from the vegetable's flesh as the durable material is more rigid and structurally stable.

A further advantage of the present invention is that it limits the number and duration of use of dangerous tools when carving the vegetable. Using the present system and method, numerous small holes do not need to be punched into the vegetable using a sharply pointed tool. Nor do the final cuts require a sharp, thin blade or saw to create the intricate design. The need to cut one aperture to allow for the insertion of the system minimizes the risk for personal injury. This is particularly important if young children will be assisting in carving of the vegetable.

Another advantage of the present invention is the interchangeability of the covers that include the design or image. Covers can be swapped at the pleasure of the consumer without requiring the consumer to purchase multiple vegetables. The present invention also allots for the addition of color to a carved design by use of colored sheets. Furthermore, the interchangeable covers and base frame are washable and reusable, as opposed to template-based systems which are suitable for only one-time use. Thus, a consumer can pack the covers and base frame along with the remainder of the holiday decorations and reuse the system year after year.

Although the present invention has been described in considerable detail with reference to certain aspects thereof, other versions are possible. Therefore, the spirit and scope of the appended claims should not be limited to the description of the aspects contained herein.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A decorating system comprising:
   a vegetable or fruit including an outer shell defining an interior space, the outer shell having an aperture defined therein;
   a base frame being disposed within the aperture and held in place in the aperture through frictional contact between the base frame and the vegetable or fruit, wherein the base frame defines an opening; and
   a cover including an outer surface with an indicia associated therewith, wherein the cover is removably coupled with the base frame, and wherein the cover extends across at least a portion of the opening defined in the base frame.

2. A system in accordance with claim 1, wherein at least one of the base frame and the cover is formed of a flexible material.

3. A system in accordance with claim 1, wherein the base frame is one of a frusto-conical ring or a cylindrical ring.

4. A system in accordance with claim 3, wherein one of the base frame and the cover is formed of a magnetic material, and the other of the base frame and the cover is formed of a material that is attracted to the magnetic material to removably couple the base frame to the cover.

5. A system in accordance with claim 1, wherein the base frame and the cover are removably coupled to one another using one or more of an adhesive, a threaded connection, and a male-to-female fastener including clips, snaps, clasps, brackets, hook-and-loop, and slotted connection.

6. A system in accordance with claim 1, wherein the indicia is at least one of a design or image, wherein the indicia is either defined in the outer surface of the cover or printed on the cover.

7. A system in accordance with claim 1, further comprising a colored sheet positioned between the interior space and the cover, wherein the colored sheet is coupled to at least one of the cover and the base frame.

8. A system in accordance with claim 1, further comprising a protective backing positioned between the interior space and the cover, wherein the protective backing is coupled to at least one of the cover and the base frame.

9. A system in accordance with claim 8, wherein the protective backing is formed of a transparent or translucent film.

10. A system in accordance with claim 1, wherein the vegetable or fruit is a pumpkin.

11. A system in accordance with claim 1, wherein the base frame is a frusto-conical ring held in place in the aperture through frictional contact between the base frame and the vegetable or fruit.

12. A decorating system comprising: a vegetable or fruit including an outer shell defining an interior space, the outer shell having an aperture defined therein; a base frame disposed within the aperture and held in place in the aperture through frictional contact between the base frame and the vegetable or fruit, wherein the base frame defines an opening; and a cover including an outer surface with an indicia associated therewith, wherein the cover is coupled with the base frame, and wherein the cover extends across at least a portion of the opening defined in the base frame; wherein the base frame includes a first edge, a second edge, and a side wall extending between the first and second edges, wherein the base frame includes a face surface adjacent to the second edge that extends outwardly from an outer surface of the side wall with the base frame disposed within the aperture.

13. A system in accordance with claim 12, wherein at least a portion of the face surface is formed of a magnetic metal.

14. A system in accordance with claim 12, wherein the base frame includes a lip extending from the face surface in a direction that is parallel with the side wall and toward the first edge, wherein the lip punctures the outer shell of the vegetable or fruit.

15. A decorating system comprising: a vegetable or fruit including an outer shell defining an interior space, the outer shell having an aperture defined therein; a base frame disposed within the aperture and held in place in the aperture through frictional contact between the base frame and the vegetable or fruit, wherein the base frame defines an opening; and a cover including an outer surface with an indicia associated therewith, wherein the cover is coupled with the base frame, and wherein the cover extends across at least a portion of the opening defined in the base frame; wherein the base frame further comprises at least one of an adhesive, bendable flaps, snaps, hooks, and clasps to securely dispose the base frame within the aperture formed in the vegetable or fruit.

16. A decorating system comprising: a vegetable or fruit including an outer shell defining an interior space, the outer shell having an aperture defined therein; a base frame disposed within the aperture and held in place in the aperture through frictional contact between the base frame and the vegetable or fruit, wherein the base frame defines an opening; and a cover including an outer surface with an indicia associated therewith, wherein the cover is coupled with the base frame, and wherein the cover extends across at least a portion of the opening defined in the base frame; wherein the base frame includes a first edge, a second edge, and a side wall extending between the first and second edges, wherein the base frame includes a ridge projecting outwardly from the side wall at a location between the first and second edges, wherein the ridge limits the insertion of the base frame within the aperture.

17. A decorating system comprising:
a pumpkin including an outer shell defining an interior space, the outer shell having an aperture defined therein;
a flexible base frame disposed within the aperture formed in the pumpkin, wherein the base frame defines an opening, and wherein the base frame is one of a frusto-conical ring or a cylindrical ring held in place in the aperture through frictional contact between the base frame and the vegetable or fruit;
a flexible cover including an outer surface with an indicia associated therewith, wherein the cover extends across at least a portion of the opening defined in the base frame;
a colored sheet positioned between the interior space and the cover; and
a protective backing positioned between the interior space and the colored sheet, wherein the protective backing is formed of a transparent or translucent film,
wherein the base frame, the cover, the colored sheet, and the protective backing are removably coupled to one another using one or more of a magnetic connection, an adhesive, a threaded connection, and a male-to-female fastener including clips, snaps, clasps, brackets, hook-and-loop, and slotted connection, and
wherein the indicia is at least one of a design or image, wherein the indicia is either defined in the outer surface of the cover or printed on the cover.

18. A system in accordance with claim 17, wherein the base frame includes a first edge, a second edge, and a side wall extending between the first and second edges, wherein the base frame includes a face surface adjacent to the second edge that extends outwardly from an outer surface of the side wall with the base frame disposed within the aperture.

19. A system in accordance with claim 18, wherein the base frame includes a lip extending from the face surface in a direction that is parallel with the side wall and toward the first edge, wherein the lip punctures the outer shell of the vegetable or fruit.

20. A decorating method comprising:
providing a vegetable or fruit including an outer shell defining an interior space, the outer shell configured for having an aperture defined therein;
providing a base frame defining an opening;
providing a cover including an outer surface with an indicia associated therewith, wherein the cover is adapted for being coupled with the base frame, and wherein the cover is configured for extending across at least a portion of the opening defined in the base frame;
cutting an aperture in the outer shell of the vegetable or fruit;
cleaning the interior space of the vegetable or fruit;
coupling the base frame with the outer shell of the vegetable or fruit so that the base frame is disposed within the aperture and held in place in the aperture through frictional contact between the base frame and the vegetable or fruit; and
removably coupling the cover with the base frame so that the cover extends across at least a portion of the opening defined in the base frame to provide a decorated vegetable or fruit.

21. A method in accordance with claim 20, further comprising:
providing a colored sheet; and
disposing the colored sheet between the cover and the interior space of the vegetable or fruit.

22. A method in accordance with claim 20, further comprising:
providing a protective backing;
disposing the protective backing between the cover and the interior space.

23. A decorating system comprising:
a vegetable or fruit including an outer shell defining an interior space, the outer shell having an aperture defined therein;
a base frame disposed within the aperture formed in the vegetable or fruit, wherein the base frame defines an opening, wherein the base frame is a frusto-conical ring including a first edge defining a first diameter, a second edge defining a second diameter, and a side wall extending between the first and second edges, and wherein the first diameter is greater than the second diameter, and wherein the base frame is held in place in the aperture through frictional contact between the side wall and the vegetable or fruit; and
a cover including an outer surface with an indicia associated therewith, wherein the cover is removably coupled with the base frame, and wherein the cover extends across at least a portion of the opening defined in the base frame.

* * * * *